United States Patent [19]

Kolosov

[11] 4,325,248
[45] Apr. 20, 1982

[54] DEVICE FOR MEASURING THICKNESS OF STORAGE CELL PLATES IN SORTING

[76] Inventor: Ivan A. Kolosov, 1 Ogorodny tupik, 15, kv. 104, Saratov, U.S.S.R.

[21] Appl. No.: 194,456

[22] PCT Filed: Aug. 14, 1979

[86] PCT No.: PCT/SU79/00065
§ 371 Date: Jun. 25, 1980
§ 102(e) Date: May 22, 1980

[87] PCT Pub. No.: WO80/00874
PCT Pub. Date: May 1, 1980

[30] Foreign Application Priority Data

Oct. 25, 1978 [SU] U.S.S.R. .............................. 2678132

[51] Int. Cl.³ .............................................. G01B 13/06
[52] U.S. Cl. ................................................ 73/37.5
[58] Field of Search ............... 73/37.5, 37.7; 209/591; 356/381

[56] References Cited

U.S. PATENT DOCUMENTS 3,046,778  7/1962  Fortier ................................. 73/37.5

FOREIGN PATENT DOCUMENTS 37552   7/1965  German Democratic Rep. .................................. 73/37.5
6500341 7/1966  Netherlands ......................... 73/37.5
375479  5/1973  U.S.S.R. .............................. 73/37.5

Primary Examiner—Kyle L. Howell
Assistant Examiner—Joseph W. Roskos
Attorney, Agent, or Firm—Steinberg & Raskin

[57] ABSTRACT

A device for measuring thickness of storage cell plates in sorting comprises a hollow case (1) divided by a movable diaphragm (2) into a measuring chamber (3) and a counterpressure chamber (4). The measuring chamber (3) connects via an outlet duct (7) with a sensing element (8) which has a space for accommodating a storage cell plate (11) to be measured. The counterpressure chamber (4) connects via an outlet duct (16) and a counterpressure nozzle (17) with a transmitting element (18) which is fixedly attached to the movable diaphragm (2) and is constructed as a wedge (19) with a blind (21) fixedly attached thereto. The device further includes an indicator of travel of the transmitting element (18) constructed as a multirange photorelay (24) acted upon by the blind (21). The wedge (19) has provision for varying the angle of the working surface (20) thereof relative to the counterpressure nozzle (17) for the purpose of adjusting the transmission ratio of the transmitting element (18) and varying the travel of the blind (21) with respect to the photorelay (24).

3 Claims, 3 Drawing Figures

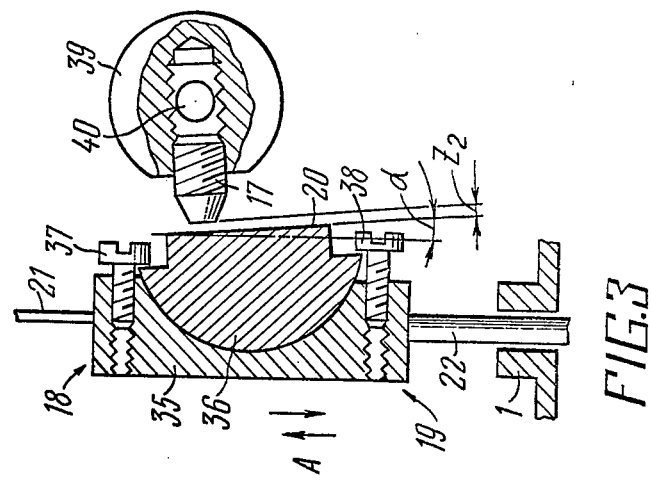
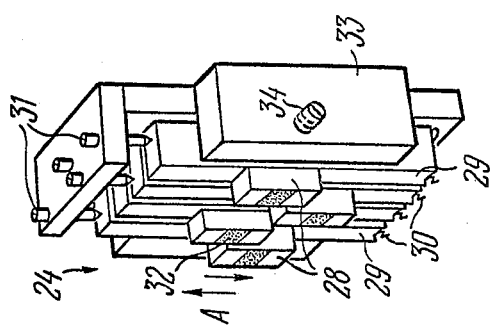

DEVICE FOR MEASURING THICKNESS OF STORAGE CELL PLATES IN SORTING

TECHNICAL FIELD

The present invention relates to storage cells and has particular reference to devices for measuring the thickness of storage cell plates in sorting.

BACKGROUND ART

When making, more specifically, sintering cerametallic frameworks for storage cell plates, the framework thickness varies so widely that it is impossible to obtain a predetermined thickness of the cell plate assembly. Therefore, it is necessary to sort cell plates into thickness groups and thereafter make a selective assembly.

At present the problem of measuring the thickness of cell plates consists in that measurements have to be taken at several points due to non-uniformity of the plate thickness. Sorting is done manually on the basis of the arithmetic mean of measurements taken with standardized measuring tools. With this method of sorting, a human element exists which adversely affects the accuracy of sorting. Furthermore, the sorting operation is laborious.

The prior art knows a lot of instruments for measuring linear dimensions. The most acceptable for solving the problem discussed herein are pneumatic instruments which enable measurements to be taken at several points simultaneously for obtaining an arithmetic mean.

Among the many pneumatic instruments, certain advantages are possessed by chamber instruments operating on the principle of compensating for forces exerted on a movable diaphragm (Balakshin O. B. "Automation of Pneumatic Dimension Checking in Mechanical Engineering", published in 1973 by Mashinostroenie Publishers, Moscow, page 159, FIG. 77, page 132, FIG. 63).

In these instruments provision is made of two flow chambers which are formed by a diaphragm installed in a hollow case. Each chamber is provided with an inlet air flow restrictor and an outlet nozzle for discharging air into the atmosphere.

In the measuring chamber, the rate of air flow through the nozzle is governed by variation in the size of the part being measured. In the counterpressure chamber, the rate of air flow through the nozzle is varied by a transmitting element which is connected to the movable diaphragm and is constructed as a taper needle adapted to close the nozzle orifice by virtue of diaphragm movement.

During the process of measurement the diaphragm moves until the taper needle balances the pressures in both chambers. A travel indicator is installed in the path of the diaphragm movement.

These instruments have a narrow measuring range (within one or two hundredths of a millimeter) inasmuch as increasing the measuring range is connected with a substantial change in sensitivity due to the employment of a taper needle as a transmitting element. Also, the transmission ratio (the ratio of the needle travel to the clearance being measured) can be increased only by changing the needle, which necessitates a complete stripdown of the instrument.

Since the measuring range required for sorting storage cell plates is several tenths of a millimeter, i.e. it is one decimal place beyond the range of the instruments under discussion, the latter can hardly be used for true measurement of storage cell thickness.

Also known in the art is a device for measuring thickness of storage cell plates in sorting (as disclosed by U.S.S.R. Inventor's Certificate No. 375479 published in the bulletin "Discoveries, Inventions, Industrial Designs and Trade Marks" No. 16, 1973) comprising a hollow case divided by a movable diaphragm into a measuring chamber having an inlet duct with an air flow restrictor and an outlet duct pneumatically connected with a sensing element having a space for accommodating a storage cell plate to be measured and a measuring nozzle facing toward this space, and a counterpressure chamber. The counterpressure chamber has an inlet duct with an air flow restrictor and an outlet duct with a counterpressure nozzle whose air flow resistance is governed by the movement of a transmitting element which has an adjustable transmission ratio, is rigidly connected to the movable diaphragm and interacts with an indicator of the transmitting element travel.

In this device, the transmitting element is constructed as a lever whose leverage is adjustable by changing the position of the fulcrum point. The travel of the lever is indicated by a pointer indicator designed for a narrow measuring range.

This device operates on the principle of compensating for forces exerted on the movable diaphragm and registering lever travel indicative of the thickness of the storage cell plate being measured. The lever has a direct effect on the counterpressure nozzle, changing the air flow resistance of the latter.

Varying the limits of the measuring range and the travel of the transmitting element causes increase in the lever angle relative to the counterpressure nozzle, which reduces sensitivity and dynamic accuracy of sorting.

Thus, in the device under consideration the constructional arrangement of the transmitting element and the indicator allows of adjusting the measuring range and the transmitting element travel only within the limits which are not sufficient for automation of the processes of measuring and sorting with a substantially high dynamic accuracy.

DISCLOSURE OF THE INVENTION

It is a general object of the present invention to provide a device for measuring thickness of storage cell plates in sorting, said device comprising a transmitting element and an indicator constructed so as to enable automation of sorting storage cell plates for thickness with a high dynamic accuracy.

The invention provides a device for measuring thickness of storage cell plates comprising a hollow case divided by a movable diaphragm into a measuring chamber and a counterpressure chamber.

The measuring chamber further comprises an inlet duct with an air flow restrictor and an outlet duct connected with a sensing element having a space for accommodating a storage cell plate to be measured and a measuring nozzle facing toward said space.

The counterpressure chamber has an inlet duct with an air flow restrictor and an outlet duct with a counterpressure nozzle the air flow resistance of which is governed by the movement of a transmitting element having an adjustable transmission ratio, rigidly connected to the movable diaphragm and adapted to actuate a transmitting element travel indicator.

According to the invention, the transmitting element travel indicator is constructed as a multirange photorelay designed for sorting storage cell plates being measured. The transmitting element includes a wedge to which is rigidly attached a blind designed to act upon the multirange photorelay. The wedge has provision for varying the angle of the working surface thereof in relation to the counterpressure nozzle for the purpose of adjusting the transmission ratio of the transmitting element and varying the travel of the blind with respect to the photorelay.

It is desirable that the multirange photorelay should comprise a set of photoresistors mounted on respective rectangular bases installed together lengthwise of the direction of travel of the transmitting element and adapted to be independently repositioned for adjusting the operational setting of the relay.

It is also desirable that the wedge of the transmitting element should comprise a carrier rigidly connected with the movable diaphragm and having a groove with a cylindrical surface and should further comprise a segment having a rectangular surface for use as a working surface of the wedge and installed in the carrier groove so as to enable changing the angle of the working surface with respect to the direction of travel of the transmitting element by means of adjusting elements, the counterpressure nozzle being movable perpendicular to the working surface of the wedge.

The device disclosed herein provides for measuring thickness of storage cell plates at several points on the surface thereof and for automatic sorting into thickness groups with high dynamic accuracy on the basis of the arithmetic mean of the thickness measurements, thereby increasing labour productivity and improving the quality of the storage cells involved. Furthermore, automatic high-accuracy sorting of storage cell plates enables automation of selective assembly thereof, thereby making for improvements in quality of storage cell plate assemblies by virtue of decreasing the tolerance on storage cell capacity.

BRIEF DESCRIPTION OF DRAWINGS

The invention will now be more particularly described by way of example with reference to the accompanying drawings, wherein:

FIG. 2 is an axonometric view of the photoresistors of FIG. 1 assembled on bases according to the invention; and FIG. 3 is a longitudinal sectional view of the transmitting element of FIG. 1 according to the invention.

BEST MODE OF CARRYING OUT THE INVENTION

Figure 1:
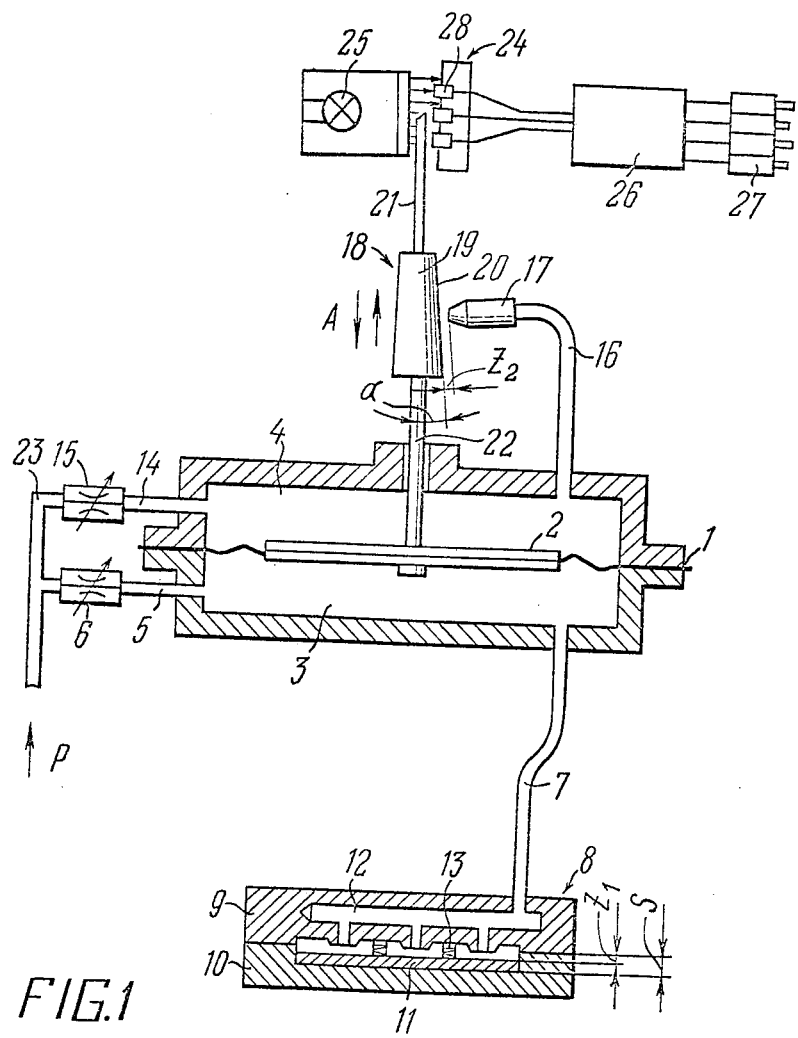
FIG. 1 is a general diagrammatic view of the device for measuring thickness of storage cell plates in sorting, according to the invention.

The device for measuring thickness of storage cell plates comprises a case 1 (FIG. 1) which is divided by a movable diaphragm 2 into a measuring chamber 3 and a counterpressure chamber 4.

The measuring chamber 3 has an inlet duct 5 with an air flow restrictor 6 and an outlet duct 7 connected with a sensing element 8. In this embodiment of the invention, the sensing element 8 is composed of two blocks 9 and 10 which form a cavity (here, a calibrated opening S) to receive a storage cell plate 11 to be measured. A measuring nozzle 12 facing toward said opening is provided in the block 9. In the embodiment herein described, the measuring nozzle 12 is constructed in the form of a row of equidistantly spaced orifices located in the block 9 at the points of measurement. The storage cell plate 11 being measured is held against the block 10 by springs 13 located near the nozzle 12. It is expedient that the dimension of the opening S be 5 to 10 percent larger than the maximum thickness of the storage cell plate to be measured. With this dimension, the clearance $Z_1$ between the nozzle 12 and the surface of a storage cell plate of the minimum thickness corresponds to the tolerance for the maximum permissible plate thickness.

The counterpressure chamber 4 has an inlet duct 14 with an air flow restrictor 15 and an outlet duct 16 with a counterpressure nozzle 17. The air flow resistance of the counterpressure nozzle 17 is governed by the movement of a transmitting element 18 (this movement is indicated by the arrow A in the illustration).

The transmitting element 18 is constructed as a wedge 19 with a working surface 20 whose angle $\alpha$ in relation to the counterpressure nozzle 17 is adjustable. The wedge 19 is rigidly connected to a blind 21 and, through the use of a rod 22, to the movable diaphragm 2.

The counterpressure nozzle 17 is installed perpendicular to the working surface 20 of the wedge 19.

The provision for adjusting the angle $\alpha$ of the working surface 20 of the wedge 19 enables varying the transmission ratio (the ratio of variation in the clearance $Z_1$ to the travel of the transmitting element 18).

Between the working surface 20 of the wedge 19 and the end of the counterpressure nozzle 17 is a clearance $Z_2$ which is to equal the clearance $Z_1$ when the transmitting element 18 is in the lowermost position, with equal flow areas of the measuring nozzle 12 and the counterpressure nozzle 17.

The inlet ducts 5 and 14 are connected via the air flow restrictors 6 and 15 and a pipeline 23 to a compressed gas system (not shown) having a pressure P (indicated by an arrow).

The device further comprises an indicator 24 of the travel of the transmitting element 18. This indicator is essentially a multirange photorelay 24 designed for sorting storage cell plates being measured. Illumination of the photorelay 24 is provided by a lighting device 25. Connected in series to the photorelay 24 are a relay unit 26, a set of actuating electromagnets 27 and a storage cell plate sorting mechanism (not shown).

The photorelay 24 comprises a set of photoresistors 28 (FIG. 2) mounted on respective rectangular bases 29 installed together lengthwise of the direction of travel of the transmitting element 19. In order to adjust the operational setting of the photorelay 24, provision is made for independently repositioning the bases 29 lengthwise of the direction of travel of the transmission element 18. For the purpose, the bases 29 bear at one end on springs 30, whereas at the other end they are secured by screws 31 adapted for adjusting the light sensitive spots 32 of the photoresistors 28. The photoresistors 28 are locked in position by a screw 33 fitted in a housing 34.

This method of securing the photoresistors 28 enables them to be adjusted for position with respect to a predetermined level, permits adjusting the photorelay 24 at the minimum range of travel of the transmitting element 18, and promotes a higher dynamic accuracy in sorting.

The wedge 19 (FIG. 1) of the transmitting element 18 comprises a carrier 35 (FIG. 3) rigidly connected with the movable diaphragm 2 by means of a rod 22 and having a groove with a cylindrical surface. The wedge 19 further comprises a segment 36 which has a rectangular surface designed to serve as a working surface 20 of the wedge 19. The segment 36 is installed in the groove in the carrier 35 so as to enable changing the angle α of the working surface 20 with respect to the direction of movement of the transmitting element 18 by means of adjusting elements 37 and 38 constructed in this embodiment of the invention as screws.

The counterpressure nozzle 17 is movable perpendicular to the working surface 20 of the wedge 19. In this embodiment of the invention, the nozzle 17 is secured by means of a screwed fastening in a rotatable head 39 whose center duct 40 connects via the outlet duct 16 (FIG. 1) with the counterpressure chamber 4.

Prior to operating the device in the automatic mode, the following tune-up is to be carried out:

First an optimum range of travel of the transmitting element 18 (FIG. 1) is to be set. For the purpose, using a flowmeter in the pipeline 23, the rates of gas flow in the inlet ducts 5 and 14 are equalized by adjusting the air flow restrictors 6 and 15, with one of the nozzles 12 and 17 fully open and the other fully closed. With this adjustment, the air flow resistors 6 and 15 should be at the mid-point of their action. Then a gauge for the minimum thickness of the storage cell plate 11 is fitted in the opening S, whereby a clearance $Z_{1\,max}$ is set up. Thereafter the counterpressure nozzle 17 (FIG. 3) is turned in the duct 40 of the rotatable head 39 so as to bring the carrier 35 into the nearly lowermost position. Then a gauge for the maximum thickness of the storage cell plate 11 is fitted in the opening S. If the wedge 19 establishes equilibrium before the blind 21 rises sufficiently to actuate the appropriate photoresistor 28 (FIG. 2), the angle α of the segment 36 (FIG. 3) is changed by varying the tension of the adjusting elements 37 and 38. Then the nozzle 17 is turned in the head 39 so that the nozzle end is perpendicular to the working surface 20 of the wedge 19 and the previous gauging operation is repeated.

The adjustment is repeated several times so as to obtain the optimum travel of the transmitting element 18 within the preset measuring range and to enhance dynamic accuracy. It should be born in mind that a large range of travel of the transmitting element 18 and, consequently, of the transmission ratio, reduces the dynamic accuracy of sorting and increases time taken to balance the system, whereas a small transmission ratio hampers the adjustment of the photoresistors 28 (FIG. 2).

After the adjustment is completed, the segment 36 (FIG. 3) is locked in place, the nozzle 17 is secured, for example, with glue, and the end surface of the nozzle 17 is lapped to the surface of the segment 36, with the carrier 35 in the uppermost position. Then the gauges for each size group of storage cell plates to be measured are installed in turn in the opening S (FIG. 1) and the position of the photoresistors 28 (FIG. 2) is adjusted by means of the screws 31 at the boundaries of the storage cell plate size groups.

By adjusting the air flow restrictors 6 and 15 (FIG. 1), the optimum operating time of the device and the feed gas pressure are set by reference to any of the gauges.

During the operation of the device the adjustment is checked by the use of the same gauges. The adjustment can be corrected by means of one of the air flow restrictors 6 and 15 or both at any of the boundary operating points of the photorelay 24 by installing the appropriate gauges.

The device operates in the automatic mode as follows:

In the initial position (there is no storage cell plate in the opening S), the clearance $Z_1$ is a maximum, the pressure in the chamber 4 (FIG. 1) substantially exceeds that in the chamber 3, the diaphragm 2 is moved into the lowermost position, and the wedge 19 sets up the maximum clearance $Z_{1\,max}$. The storage cell plate 11 is delivered into the opening S in the sensing element 8 by means of a conventional loading device. When the free space between the blocks 9 and 10 is reduced, the air flow resistance of the nozzle 12 changes due to decrease in the clearance $Z_1$, the pressure in the measuring chamber 3 rises, and the transmitting element 18 travels upward, reducing the clearance $Z_2$ and the air flow resistance of the nozzle 17. When the clearances $Z_1$ and $Z_2$ become equal, the pressures in the chambers 3 and 4 are balanced, the blind 21 stops and obstructs a part of the luminous flux from the lighting device 25 to the photorelay 24. In this case the top edge of the blind 21 covers the light sensitive spot 32 (FIG. 2) appropriate to the thickness group of the storage cell plate being measured. Measurements taken at several points on the surface of the storage cell plate provide for obtaining an arithmetic mean of the plate thickness with a high dynamic accuracy.

The photoresistors 28 (FIG. 1) are connected with the relay units 26 and the electromagnets 27 in such a manner that successive darkening of the photoresistors 28 causes successive energizing of the electromagnets 27. When the succeeding electromagnet 27 is energized, the preceding one is de-energized so as to leave alive only the electromagnet whose photoresistor is darkened last. Inasmuch as the electromagnets 27 are connected with a sorting mechanism, the storage cell plate discharged from the opening S gets into a pocket corresponding to its size.

Thus, automatic sorting of storage cell plates provides for automation of selective assembly thereof and consequent enhancing of the quality of the plate assemblies thereby produced.

Industrial Applicability

The present invention can be applied for automation of sorting plates for powerful storage cells containing many closely assembled electrodes, for example, those employed in aviation, motor vehicles and other applications.

The present invention can also find application in other industries for taking measurements in sorting parts for selective assembly.

I claim:

1. A device for measuring thickness of storage cell plates in sorting, comprising a hollow case divided by a movable diaphragm into a measuring chamber and a counterpressure chamber, said measuring chamber having an inlet duct with an air flow restrictor and an outlet duct connected with a sensing element provided with a space for accommodating a storage cell plate to be measured and further provided with a measuring nozzle facing toward said space, said counterpressure chamber having an inlet duct with an air flow restrictor and an outlet duct with a counterpressure nozzle the air flow resistance of which is governed by the movement of a transmitting element having an adjustable transmission ratio, rigidly connected to the movable diaphragm and adapted to actuate a transmitting element travel indicator, characterized in that the indicator of the travel of the transmitting element (18) is constructed as a multirange photorelay (24) designed for sorting storage cell plates (11) being measured, and the transmitting element (18) includes a wedge (19) to which is rigidly attached a blind (21) designed to act upon the multirange photorelay (24), said wedge (19) having provision for varying the angle of the working surface (20) thereof in relation to the counterpressure nozzle (17) for the purpose of adjusting the transmission ratio of the transmitting element (18) and varying the travel of the blind (21) with respect to the photorelay (24).

2. A device as in claim 1, characterized in that the multirange photorelay (24) comprises a set of photoresistors (28) mounted on respective rectangular bases (29) installed together lengthwise of the direction of travel of the transmitting element (18) and adapted to be independently repositioned for adjusting the operational setting of the multirange photorelay (24).

3. A device as in claim 2, characterized in that the wedge (19) of the transmitting element (18) comprises a carrier (35) rigidly connected with the movable diaphragm (2) and having a groove with a cylindrical surface, and further comprises a segment (36) having a rectangular surface for use as a working surface (20) of the wedge (19) and installed in the groove in the carrier (35) so as to enable changing the angle of the working surface (20) with respect to the direction of travel of the transmitting element (18) by means of adjusting elements (37, 38), the counterpressure nozzle (17) being movable perpendicular to the working surface (20) of the wedge (19).

* * * * *